US011048429B2

(12) United States Patent
Rodgers

(10) Patent No.: US 11,048,429 B2
(45) Date of Patent: Jun. 29, 2021

(54) OPTIMIZED LOGGING MODULE

(71) Applicant: Oracle International Corporation, Redwood Shores, CA (US)

(72) Inventor: Michael Patrick Rodgers, Rochester, MN (US)

(73) Assignee: Oracle International Corporation, Redwood Shores, CA (US)

( * ) Notice: Subject to any disclaimer, the term of this patent is extended or adjusted under 35 U.S.C. 154(b) by 160 days.

(21) Appl. No.: 15/957,736

(22) Filed: Apr. 19, 2018

(65) Prior Publication Data

US 2019/0324649 A1    Oct. 24, 2019

(51) Int. Cl.
*G06F 3/06* (2006.01)
*G06F 9/54* (2006.01)

(52) U.S. Cl.
CPC .......... *G06F 3/065* (2013.01); *G06F 3/0604* (2013.01); *G06F 3/0656* (2013.01); *G06F 3/0683* (2013.01); *G06F 9/542* (2013.01); *G06F 9/544* (2013.01); *G06F 9/546* (2013.01)

(58) Field of Classification Search
CPC ........ G06F 3/064; G06F 3/0647; G06F 3/065; G06F 3/0656; G06F 3/0604; G06F 3/0683; G06F 9/542; G06F 9/544; G06F 9/546
USPC .......................................... 711/165, 161, 162
See application file for complete search history.

(56) References Cited

U.S. PATENT DOCUMENTS

| | | | |
|---|---|---|---|
| 2006/0190832 A1* | 8/2006 | Lin ...................... | G06F 3/04812 715/764 |
| 2007/0174684 A1* | 7/2007 | Englert .................. | G07C 5/008 714/12 |
| 2018/0279105 A1* | 9/2018 | Huber .................... | B64C 39/024 |
| 2019/0205129 A1* | 7/2019 | Tameshige .............. | G06F 9/542 |

\* cited by examiner

*Primary Examiner* — Yaima Rigol
*Assistant Examiner* — Edward Waddy, Jr.
(74) *Attorney, Agent, or Firm* — Invoke

(57) ABSTRACT

Techniques are disclosed that allow for retroactively capturing a debug/trace-level log without experiencing the severe performance degradation that obtaining such a log would otherwise entail. Trace-level logging is performed by maintaining a buffer of log messages for application events. The buffer is allocated a memory having very fast write speeds, and writing such messages into the buffer has a negligible performance impact. Many of the messages written into the buffer may not be important or useful at the time they are written. However, when a failure occurs, the messages may be useful for figuring out what when wrong. Responsive to detecting a failure or other anomalous event, the buffer of messages is automatically written to a permanent storage. Although writing to the permanent storage may be slow, the performance degradation is only incurred when a failure occurs.

20 Claims, 4 Drawing Sheets

OPTIMIZED LOGGING MODULE

TECHNICAL FIELD

The present disclosure relates to logging events for use in troubleshooting. Specifically, the disclosure is directed to temporarily logging events in an event buffer by overwriting prior events, until a triggering event is detected for copying the current buffer events to secondary memory.

BACKGROUND

Computer systems execute operations that may be logged as events. When an error occurs in a production environment, it is often necessary to obtain a highly-detailed, trace-level stream of events to diagnose and correct the defect. Full debug logging generally involves storing every event for analysis in long term storage systems. Enabling full debug logging has a highly deleterious effect on performance, in extreme cases rendering the system nearly useless.

Various solutions have been implemented to improve performance while allowing for debugging operations that rely on logged events. As an example, a separate, debug environment can be set up as a clone of the production environment. A problem can be reproduced in the separate debug environment to obtain a log of events associated with the problem. In another solution, logging may be disabled at times to improve performance. Logging may be disabled until an error is detected. Once an error is detected, logging is enabled, and prior operations are re-executed in an effort to duplicate the error. If the error is successfully duplicated, then the logged events may be analyzed. In another solution, logging may only be enabled for a subset of systems or operations. Logging may be enabled for system components that are prone to errors, or system components of high importance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
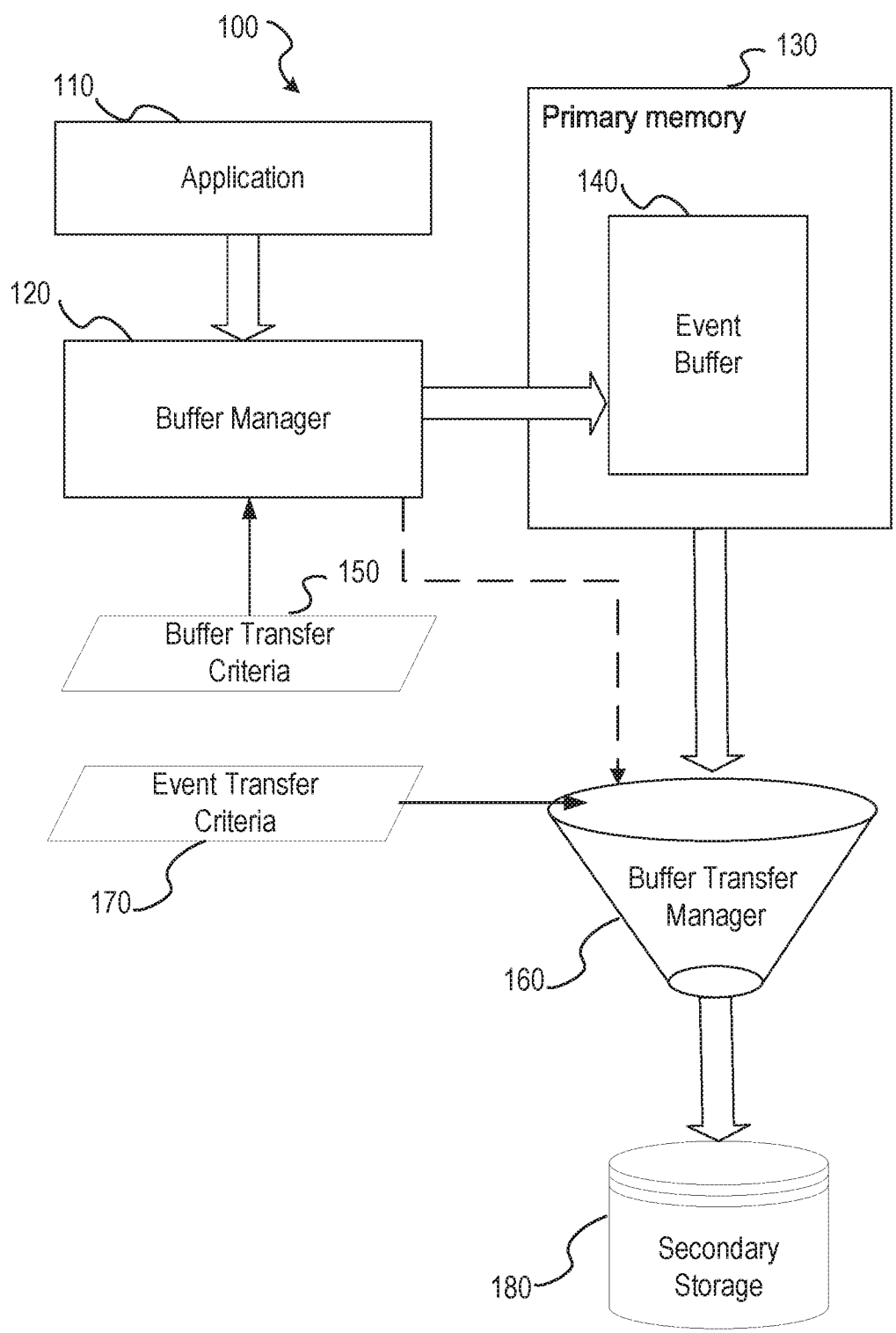
FIG. 1 is a block diagram that illustrates components of the system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present invention.

1. General Overview

One or more embodiments include capturing a trace-level log of system events. An event may correspond to an operation, a modification of a state, or modification of a data set. As an example, an event may correspond to a low-level operation executed by a processor. An event may correspond to an application-level operation that is executed as a set of sub-tasks.

The system implements an event buffer for recording log messages corresponding to events. The buffer may be implemented on local, high-performance memory with fast write speeds such that recording messages into the buffer has a negligible performance impact. Many of the messages may not be important or useful at the time they are stored. As new events are detected and recorded into the buffer as log messages, prior log messages corresponding to prior events are overwritten. Messages, in the buffer, may be overwritten without being transferred to another storage system (such as non-volatile memory), or further processed in any way. When a triggering event is detected, the system copies at least a subset of the log messages currently stored in the buffer to secondary storage. A triggering event is an event that meets a buffer transfer criteria. A triggering event may correspond, for example, to any anomaly or error that is to be analyzed using the log messages.

Implementing the event buffer in local, high-performance memory advantageously allows for initial, temporary recording of events without significant performance degradation. Writing to secondary storage may be computationally more expensive, require more time, or result in greater performance degradation than writing to the event buffer implemented on local, high-performance memory. Advantageously, embodiments described herein transfer log messages from the event buffer to secondary memory in response to triggering events rather than as standard procedure for all events in the event buffer. Only a subset of events, i.e., the events stored in the buffer when a triggering event is detected, are transferred to secondary storage.

One or more embodiments described in this Specification and/or recited in the claims may not be included in this General Overview section.

2. Terminology

Event: An event corresponds to an identifiable execution of an operation, a change in an execution state of a system component, or a change in a data set. Examples of events include a component failure, a system failure, execution of a particular instruction in code, an update in a value of a variable, and a receipt of user input. An event may be detected during the execution of an application. While examples herein describe events with reference to an application for purposes of clarity, events may correspond to any operating system process or application process in accordance with one or more embodiments. Events may be analyzed for troubleshooting or debugging failures. Events may be analyzed for investigating errors or anomalies.

Logging: Logging is a process for recording information about events. Event information may be recorded as log messages in an event buffer. A log message usually includes a timestamp, an event type, and an event severity. An event type, or an event severity may indicate how important this log message is for troubleshooting or debugging purposes. A log message may identify a code module that was executing at the time of the event, a file name, or a line number. As used herein, logging an event means writing a log message with information about an event. As used herein, a log message for an event refers to a message that (a) was created in response to detecting the event and (b) contains information about the event.

Trace-level logging: Trace-level logging captures very detailed information about the execution state over time in fine-grained log messages. Log messages are expected to be useful for understanding the state of the system leading up to a failure. Trace-level logging may add a significant amount of time to the execution of an application. Trace-level logging may require significant memory space for storage of log messages. Trace-level logging may also be referred to as debug logging.

Primary memory: Primary memory, as referred to herein, comprises a storage device having a faster I/O speed than secondary storage as referred to herein. The write speed of primary memory may be fast enough such that writing events to the primary memory has a negligible or minimal impact on performance. Primary memory may be implemented on CPU cache, Random Access Memory (RAM) or a Solid-State Drive (SSD). A limited amount of primary memory is allocated as a buffer to store log messages. New log messages may be stored to the buffer by overwriting prior log messages stored to the buffer. The earliest-written prior message in a buffer may be selected for overwriting.

Secondary storage: Secondary storage, as referred to herein, includes a persistent storage system that has a lower write speed than the primary memory as referred to herein. Examples of secondary memory include a hard disk and a remote storage server. Log messages written to secondary storages are not generally overwritten as a function of later arriving messages. Rather, log messages in secondary memory are preserved as needed for analysis and debugging.

Buffer Transfer: Buffer transfer refers to the process of copying log messages from primary memory to secondary storage.

Buffer Transfer Criteria: The buffer transfer criteria comprise start transfer criteria and stop transfer criteria which comprise a set of circumstances that trigger starting and stopping a buffer transfer respectively. The criteria may be expressed using values of event attributes.

Event Transfer: Event transfer refers to the process of copying a log message for an event from the event buffer to secondary storage.

Event transfer criteria: Event transfer criteria are the set of criteria that are used to determine whether a particular log message corresponding to an event is copied from the primary memory to the secondary storage during a buffer transfer of log messages.

3. Event Logging Architecture

FIG. 1 is a block diagram that illustrates components of an event logging architecture, in accordance with one or more embodiments. System 100 includes components for capturing information about events that may be useful for debugging errors, failures, or anomalies. In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Application 110 is an application that executes operations and/or modifies data sets. As an example, application 110 may correspond to a database application. The database application may be used to store, modify, and delete data sets. The application 110 may correspond to a manufacturing application. The manufacturing application may be used for tracking the development of vehicles. As another example, application 110 may correspond to a customer relationship management application. The customer relationship management application may be used to manage current and potential customers. Execution of application 110 may generate a set of events.

An application logging module (not shown) may generate a log message with information about an event(s). The application logging module may be implemented as a component of the application 110, as a component of buffer manager 120, as a stand-alone component in system 100, or as a sub-component of any other component in system 100.

In an embodiment, the buffer manager 120 corresponds to software or hardware that stores log messages, corresponding to events, in the event buffer 140. The buffer manager may replace the implementation of an application's logging module. The buffer manager may itself generate the log messages. Alternatively, the buffer manager may be a module independent of an application's logging module, and the logging module may send log messages to the buffer manager rather than directly to the operating system for performing buffer writes. The buffer manager 120 may initiate a transfer of log messages from the event buffer 140 to secondary storage 180 based at least on the buffer transfer criteria 150.

Event buffer 140 corresponds to a buffer for temporarily storing log messages corresponding to events. Event buffer 140 is implemented on a small amount of primary memory. The buffer may be a fixed size. In most cases, a log message requires less than 1000 bytes. Generally, 2000 trace-level logging messages may be stored in a 2 MB buffer. The event buffer 140 may be a circular buffer or a looping array in which a new message overwrites the oldest previously-written message when the event buffer 140 becomes full. Messages in the event buffer 140 may be overwritten without being copied into secondary storage 180. Messages in the event buffer 140 may be overwritten before being analyzed or processed in any way.

In an embodiment, a buffer transfer manager 160 corresponds to software or hardware that manages the transfer of log messages from the event buffer 140 in primary memory 130 into secondary storage 180. The buffer transfer manager 160 starts the transfer of log messages based on triggers generated by the buffer manager 120. The buffer transfer manager 160 may perform targeted logging by filtering log messages in the event buffer according to event transfer criteria 170.

Event transfer criteria 170 defines event characteristics for events. An event transfer criteria may define, for example, a session id, an event type, or an event security level. Different event transfer criteria 170 may be used for different buffer transfer events. A triggering event, which resulted in a buffer transfer event, may be mapped to the corresponding event transfer criteria 180 to be used for that buffer transfer event.

The event transfer criteria 170 may define event characteristics corresponding to events to be transferred or events not to be transferred to secondary storage. The system may be configured such that log messages (in the event buffer), that correspond to events with characteristics defined by the event transfer criteria, may be transferred during an event buffer transfer event. Alternatively, log messages, that correspond to events with characteristics defined by the event transfer criteria, may be filtered out and not transferred during the event buffer transfer event.

In an embodiment, secondary storage 180 corresponds to a persistent storage system that has a lower write speed than the primary memory. Secondary storage 180 may include, for example, a remote server or a rotating platter disk drive. The write speed for memory as referred to herein includes I/O speed for the system to write log messages to memory. A location of the memory (e.g., local or remote to the system) affects the I/O speed for the system to write log messages to memory.

4. Event Logging Process

Figure 2:
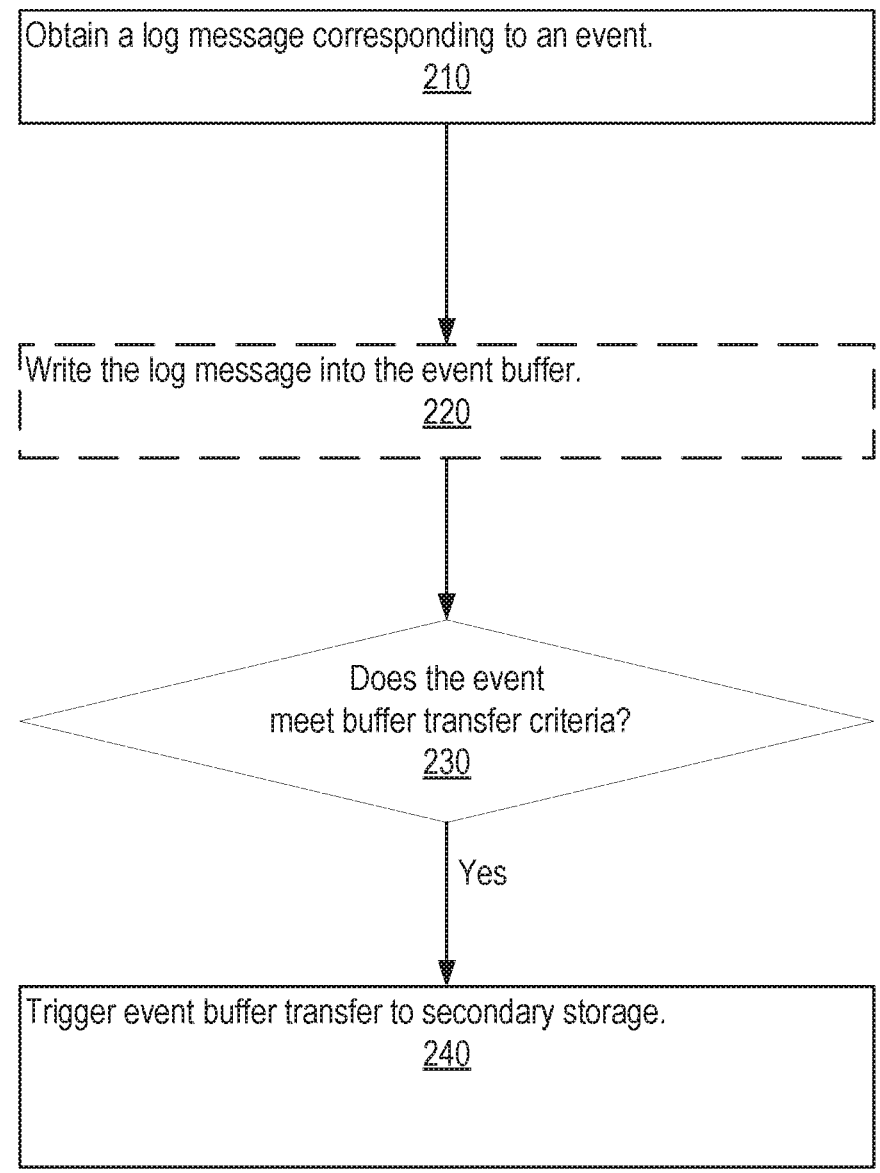
FIG. 2 is a flow diagram that illustrates at a high level the process receiving an event from an application and processing the event, in accordance with one or more embodiments.

FIG. 2 illustrates an example set of operations for logging events in a temporary buffer in accordance with one or more embodiments. One or more operations illustrated in FIG. 2 may be modified, rearranged, or omitted altogether. Accordingly, the particular sequence of operations illustrated in FIG. 3 should not be construed as limiting the scope of one or more embodiments.

Initially, a buffer manager obtains a log message corresponding to an event (Operation 210). The buffer manager may receive the log message directly or indirectly from an application associated with the event. The buffer manager may obtain the log message from a logging module of the application. The buffer manager may itself generate the log message based on a detected event. As an example, application events may be published in an event stream. The buffer manager subscribes to the event stream to detect events associated with the application. The buffer manager generates the log message with data from the event stream.

The buffer manager writes the log message into an event buffer for temporary storage (Operation 220). Writing the log message into the event buffer may overwrite a previously-written log message. A selection criteria may be used for selecting a prior log message to be overwritten with a new log message. The selection criteria may be based on an age, priority level, type or other event attribute associated with the events corresponding to the prior log messages. As an example, the selection criteria may simply define the oldest log message to be overwritten with the new log message. As another example, the selection criteria may define an order for selecting log messages to be overwritten: (a) low priority events that are more than one day old, (b) high priority events that are more than three days old, (c) low priority events that are less than one day old, and (d) high priority events that are less than three days old. The buffer manager or another component may select the log message to be overwritten based on the category of the log message and the selection order defined by the selection criteria.

The buffer manager may skip writing certain log messages to the event buffer for certain types of events or circumstances. As an example, if the event corresponding to a log message is a triggering event for an event buffer transfer, the log message may be directly written to secondary memory without writing to the event buffer. In another example, an application may log a triggering event solely to trigger an event buffer transfer. If the log message for the triggering event does not include any useful information for debugging, the log message may not necessarily be logged.

In an embodiment, the buffer manager compares the attributes of the event to the buffer transfer criteria to determine whether the event meets the buffer transfer criteria. (Operation Step 230). The buffer transfer criteria define attributes of events. Events that match the buffer transfer criteria may trigger the start or stop of a buffer transfer. As an example, a buffer transfer criteria may define a component failure. Log messages which correspond to failure of the component, meet the buffer transfer criteria. As another example, the buffer transfer criteria may define a particular event type: spike in CPU usage above a threshold level. The buffer manager determines that a particular log messages corresponds to an alert indicating that CPU usage is above the threshold level defined in the buffer transfer criteria. In response, the buffer determines that the buffer transfer criteria has been met.

If the buffer transfer criteria is met, then the buffer manager triggers an event buffer transfer (Operation Step 240). An event buffer transfer involves copying one or more of the log messages currently stored in the event buffer, from the event buffer to secondary storage. Prior log messages in the event buffer that have already been overwritten are not transferred. Accordingly, an event buffer transfer generally transfers only a subset of the events that were at some point, written into the event buffer. Thus, the overhead of writing log messages to secondary storage may only occur upon detecting a triggering event such as an error that needs diagnosis. The log messages stored in the event buffer at the time of the triggering event are likely relevant to diagnosing the triggering event.

Copying log messages from the event buffer to secondary storage, as referred to herein, may include (a) retaining a copy of the log messages in the event buffer until they are overwritten with new log messages, or (b) deleting the copy of the log message in the event buffer upon transfer to secondary memory.

Not all failures can be detected automatically by the system, and sometimes a failure or incorrect behavior may be observable to a user without producing an error message. A user noticing a failure may interact with the system to initiate an event buffer transfer. That is, the buffer manager may trigger an event buffer transfer in response to user input.

An event buffer transfer may involve a transfer of only the log messages in the event buffer at the time of the triggering event. Alternatively, the event buffer transfer may involve a continuous transfer of log messages from the event buffer to the secondary memory until a stop transfer command is received. As an example, when the buffer manager triggers an event buffer transfer, the buffer manager may set a timer for the length of time that log messages should be transferred from the event buffer to secondary storage. When the timer expires, the buffer manager may trigger the buffer transfer manager to stop transferring log messages to secondary storage. As another example, the buffer manager may trigger stopping the transfer of the event buffer upon detecting execution of a checkpoint within an application. As another example, the buffer manager may trigger stopping the transfer of the event buffer in response to obtaining a log message for a particular type of event that signals that normalcy has been restored. The log message may indicate that CPU utilization is below 30% indicating that the abnormal spike in CPU utilization has reduced to normal levels. As another example, the buffer manager may trigger the start of the event buffer transfer with a number of messages to transfer, and the buffer transfer manager may stop the transfer of the event buffer after the specified number of messages are transferred.

In an embodiment, the buffer manager may receive a trigger in response to user input to stop the transfer. The user may trigger stopping the message transfer when the problem is resolved, or no new data is needed to troubleshoot the problem.

In an embodiment, in conjunction with triggering an event buffer transfer, the buffer manager may change the event transfer criteria to cause the buffer transfer to log events after the failure that would best help in understanding the failure. In some cases, the severity level threshold for triggering event buffer transfer may be lowered. In other cases, event types that are more relevant to the failure may be transferred while other events are not transferred. In an embodiment, upon stopping the transfer of message to secondary storage, the event transfer criteria may be reset to default settings.

In an embodiment, after the buffer manager triggers an event buffer transfer, the buffer manager may write subsequently-received log messages directly to secondary storage, bypassing the event buffer. Alternatively, the buffer manager may send log messages directly to the buffer transfer manager without storing the message in the event buffer first. The buffer transfer manager may filter the messages according to the event transfer criteria as discussed earlier. The buffer manager may continue bypassing the event buffer until a stop transfer trigger is received.

During an event buffer transfer, the events in the event buffer may be further filtered by a buffer transfer manager. The buffer transfer manager may filter events based on an event transfer criteria that is separate from the buffer transfer criteria. The characteristics of each event, corresponding to log messages in the event buffer, are compared to the event transfer criteria. If the characteristics of the event match the event transfer criteria, then the corresponding log message is transferred from the event buffer to the secondary memory during the event buffer transfer. If the characteristics of the event do not match the event transfer criteria, then the corresponding log message is not transferred from the event buffer to the secondary memory.

In an embodiment, the buffer transfer manager may aggregate multiple log messages that meet the event transfer criteria to write the multiple log messages into secondary memory in a single write transaction.

In an embodiment, a single application log file may be appended with each event buffer transfer. Alternatively, each event buffer transfer may be stored in separate log files.

In addition to the buffer manager triggering an event buffer transfer in response to receiving an event, the buffer manager may offer a programmatic interface, which when invoked, would cause the buffer manager to trigger the buffer transfer manager to start or stop an event buffer transfer. Alternatively, the buffer transfer manager may provide a programmatic interface that could be invoked directly by the application to start or stop an event buffer transfer. Accordingly, instead of generating a log message to cause the triggering of an event buffer transfer, the message having no useful information about the event, the application may instead directly trigger the buffer transfer manager to start or stop a transfer without using the logging interface such as with a function call.

In an embodiment, a plurality of event buffers may be used, or an event buffer may be partitioned into a plurality of buffers, to store distinct kinds of log messages. For example, each buffer or buffer partition may store only log messages for events having a particular severity. In other words, log messages for high severity events may be stored in a different buffer from log messages for low severity events. Having separate buffers may be advantageous when the frequency of different event types is very different, allowing the buffer for such event types to be sized to accommodate an expected volume of messages to maintain a history messages spanning a certain length of time. In that way, the system can avoid having a frequent but less informative message overwriting a less frequent and more important message in the event buffer. Another advantage of using partitioned buffers is that it facilitates transferring only certain types of events by transferring only the corresponding buffers.

Figure 3:
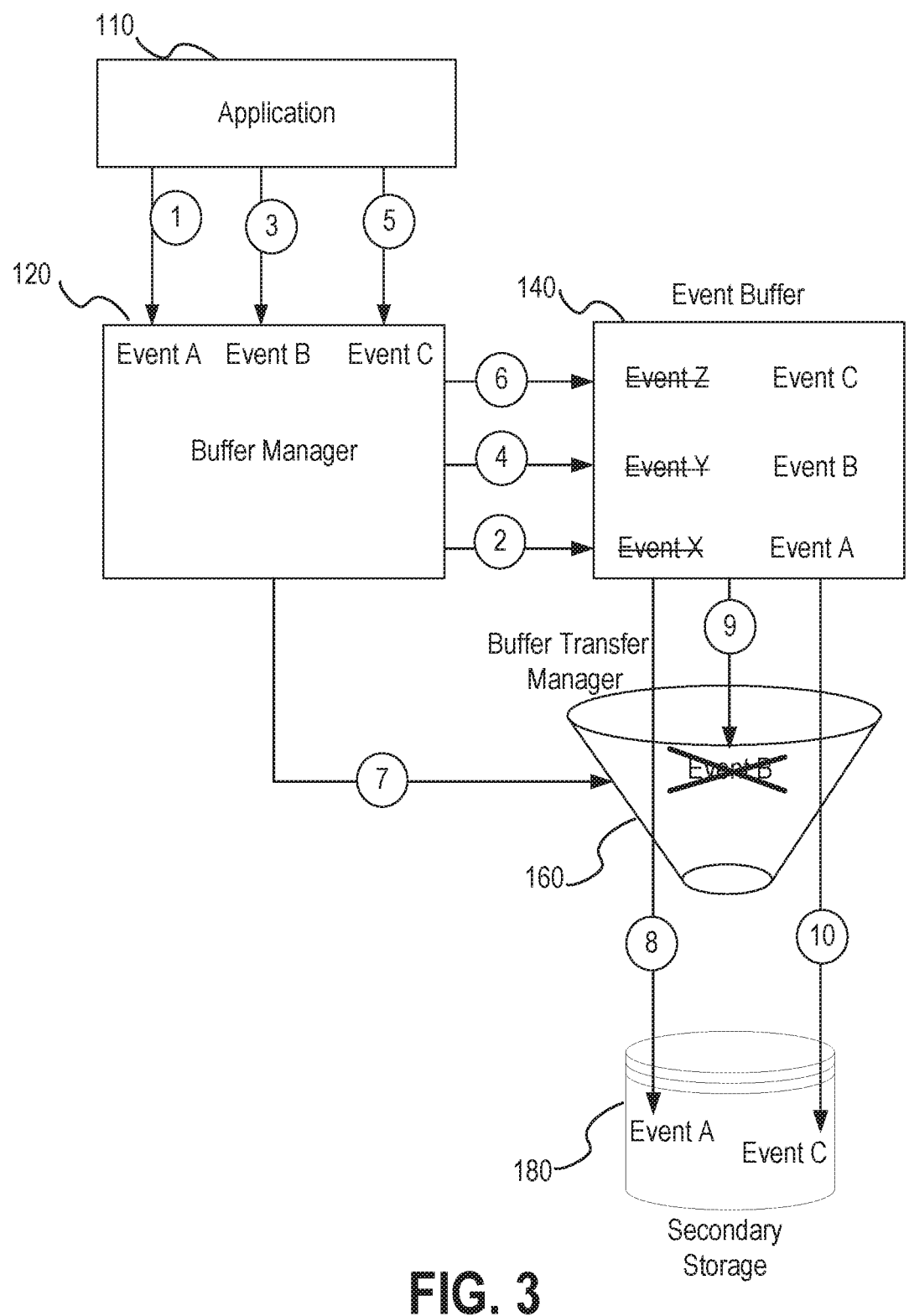
FIG. 3 is a block diagram that illustrates an example of receiving a sequence of events and transferring the event buffer to secondary storage.

FIG. 3 is a block diagram that illustrates an example of receiving a sequence of events and transferring the event buffer to secondary storage. The sequence of steps is indicated by the circled numbers. At step 1, the application sends a log message for event A to the buffer manager. Hereinafter, "event A" is used as a shorthand notation for "the log message for event A" or "the information in the log message for event A." The buffer manager determines that event A does not meet the buffer transfer criteria. In step 2, the buffer manager writes event A to the event buffer, overwriting event X. In step 3, the application sends event B to the buffer manager. The buffer manager determines that event B does not meet the buffer transfer criteria. In step 4, the buffer manager writes event B to the event buffer, overwriting event Y. In step 5, the application sends event C to the buffer manager. The buffer manager determines that event C meets the buffer transfer criteria and that event C should be written to the event buffer. In step 6, event C is written to the event buffer, overwriting event Z. In step 7, the buffer manager triggers the buffer transfer manager to start transferring the event buffer to secondary storage. In step 8, the buffer transfer manager receives/retrieves event A, determines that it meets the event transfer criteria, and includes event A in a buffer to be written to the secondary storage. In step 9, the buffer transfer manager receives/retrieves event B, determines that event B does not meet the event transfer criteria, and does not transfer event B to secondary storage. In step 10, the buffer transfer manager receives/retrieves event C, determines that it meets the event transfer criteria, and includes event C in a buffer to be written to the secondary storage.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at various times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID.

Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
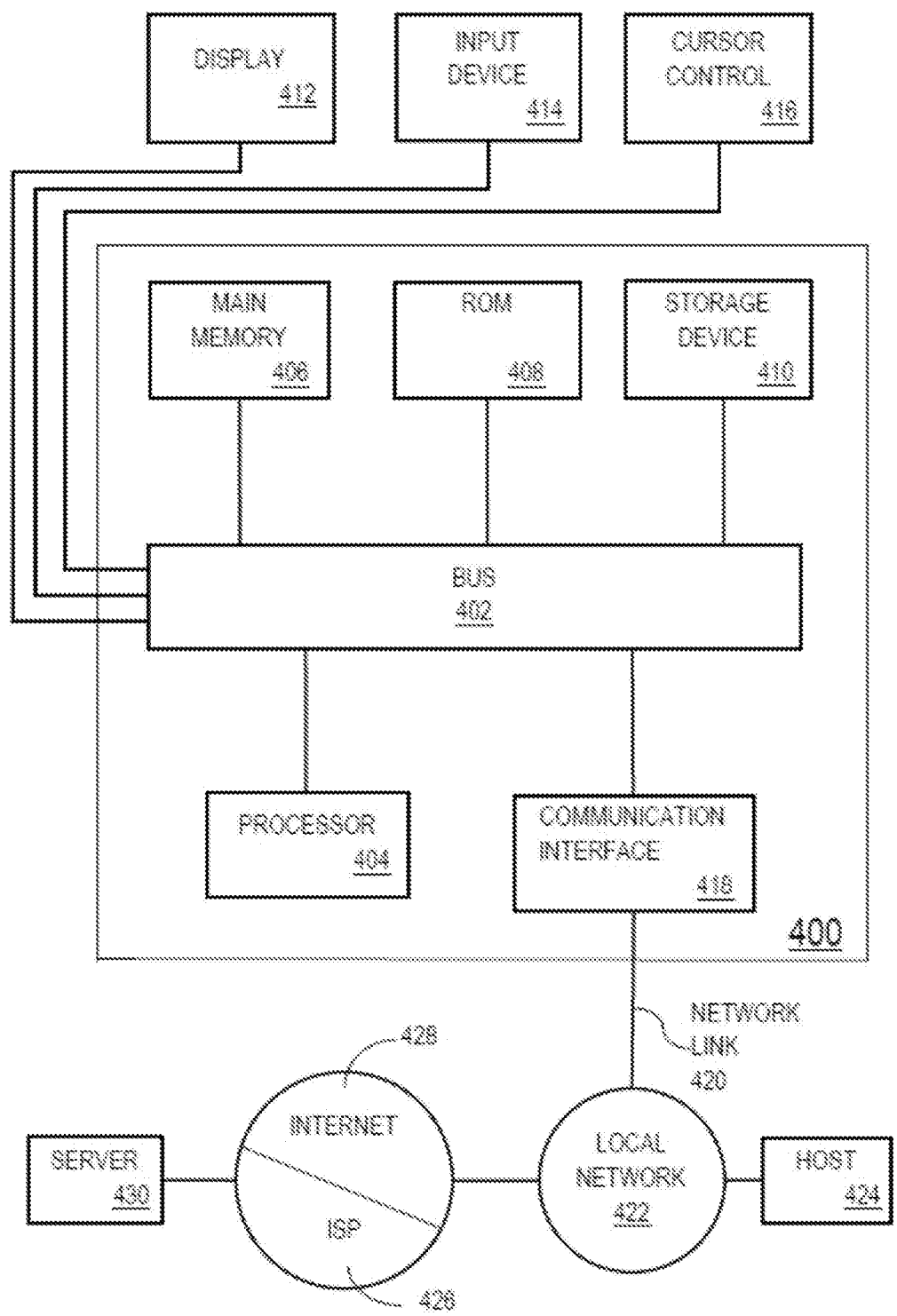
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    detecting a first event associated with execution of a first operation;
    determining that the first event does not meet a buffer transfer criteria for an event buffer implemented in primary memory;
    storing a first log message for the first event in the event buffer by overwriting a prior log message previously stored in the event buffer;
    subsequent to storing the first log message in the event buffer, detecting a second event associated with execution of a second operation;
    determining that the second event meets the buffer transfer criteria for the event buffer; and
    responsive to determining that the second event meets the buffer transfer criteria:
        copying a plurality of log messages stored during an event logging session from the event buffer to secondary storage, the plurality of log messages comprising the first log message and at least one additional log message that logs an event detected after the second event was logged, the at least one additional log message logged for analysis of the second event.

2. The medium of claim 1, wherein the operations further comprise:
    prior to copying the plurality of log messages from the event buffer to the secondary storage, storing a second log message for the second event in the event buffer, wherein the plurality of log messages further comprises the second log message.

3. The medium of claim 1, wherein the operations further comprise:
    prior to detecting the second event, temporarily refraining from transferring any log messages from the event buffer to the secondary storage in response to determining that the first event does not meet the buffer transfer criteria.

4. The medium of claim 1, wherein the operations further comprise selecting a subset of log messages stored in the event buffer as the plurality of log messages to be transferred from the event buffer to the secondary storage, wherein each particular log message of the subset of log messages is selected based on the particular log message logging an event that meets a filter criteria.

5. The medium of claim 4, wherein the buffer transfer criteria comprises one of:
    a) a start buffer transfer indication received from a user;
    b) an event severity level;
    c) a type of event; or
    d) a session id identified in an event.

6. The medium of claim 1,
    wherein the buffer transfer criteria comprises a threshold event severity level,
    wherein determining that the first event does not meet the buffer transfer criteria comprises determining that an event severity level corresponding to the first event does not cross the threshold event severity level,
wherein determining that the second event meets the buffer transfer criteria comprises determining that an event severity level corresponding to the second event crosses the threshold event severity level.

7. The medium of claim 1, wherein the operations further comprise:
copying, to the secondary storage, log messages logged for events that are detected subsequent to detecting the second event, until a stop transfer criteria is met.

8. The medium of claim 7, wherein the stop transfer criteria comprises one of:
a) receiving a stop buffer transfer indication from a user,
b) exceeding a threshold number of log messages transferred,
c) reaching a particular checkpoint,
d) exceeding a threshold amount of time since the transfer of the plurality of log messages from the event buffer to the secondary storage.

9. The medium of claim 1, wherein the primary memory comprises a Read Access Memory (RAM), and the secondary storage comprises disk storage.

10. The medium of claim 1, wherein the primary memory comprises a local storage, and the secondary storage comprises a remote storage.

11. The medium of claim 1, wherein the primary memory comprises a flash memory.

12. The medium of claim 1, wherein the operations further comprise:
prior to copying the plurality of log messages from the event buffer to the secondary storage, storing a second log message for the second event in the event buffer, wherein the plurality of log messages further comprises the second log message;
prior to detecting the second event, temporarily refraining from transferring any log messages from the event buffer to the secondary storage in response to determining that the first event does not meet the buffer transfer criteria;
selecting a subset of log messages stored in the event buffer as the plurality of log messages to be transferred from the event buffer to the secondary storage, wherein each particular log message of the subset of log messages is selected based on the particular log message logging an event that meets a filter criteria;
wherein the buffer transfer criteria comprises one of: a) an event severity level, b) a type of event, or c) a session id identified in an event;
copying, to the secondary storage, log messages logged for events that are detected subsequent to detecting the second event, until a stop transfer criteria is met;
wherein the stop transfer criteria comprises one of: a) receiving a stop event buffer transfer indication from a user, b) exceeding a threshold number of log messages transferred, c) reaching a particular checkpoint, d) exceeding a threshold amount of time since the transfer of the plurality of log messages from the event buffer to the secondary storage;
wherein the primary memory comprises a Read Access Memory (RAM), and the secondary storage comprises disk storage.

13. A non-transitory computer readable medium comprising instructions which, when executed by one or more hardware processors, causes performance of operations comprising:

detecting a first event associated with execution of an operation;
storing a first log message for the first event in an event buffer implemented in primary memory by overwriting a prior log message previously stored in the event buffer;
subsequent to storing the first log message for the first event, detecting a triggering event that meets a buffer transfer criteria; and
responsive to detecting the triggering event, copying a plurality of log messages stored during an event logging session from the event buffer to secondary storage, wherein the plurality of log messages includes the first log message and at least one additional log message that logs an event detected after the triggering event was logged, the at least one additional log message logged for analysis of the triggering event.

14. The medium of claim 13, wherein the triggering event comprises detection of at least one of: a) a component failure and b) system performance degradation.

15. The medium of claim 13, wherein the operations further comprise selecting a subset of log messages stored in the event buffer as the plurality of log messages to be transferred from the event buffer to the secondary storage, wherein each particular log message of the subset of log message is selected based on the particular log message logging an event that meets an event transfer criteria.

16. The medium of claim 13,
wherein the buffer transfer criteria comprises a threshold event severity level,
wherein determining that the first event does not meet the buffer transfer criteria comprises determining that an event severity level corresponding to the first event does not meet cross the threshold event severity level,
wherein determining that the second event meets the buffer transfer criteria comprises determining that an event severity level corresponding to the second event meets crosses the threshold event severity level.

17. The medium of claim 13,
wherein the triggering event comprises detection of a component failure;
wherein the operations further comprise selecting a subset of log messages stored in the event buffer as the plurality of log messages to be transferred from the event buffer to the secondary storage, wherein each particular log message of the subset of log message is selected based on the particular log message logging an event that meets an event transfer criteria;
wherein the buffer transfer criteria comprises a threshold event severity level,
wherein determining that the first event does not meet the buffer transfer criteria comprises determining that an event severity level corresponding to the first event does not meet cross the threshold event severity level,
wherein determining that the second event meets the buffer transfer criteria comprises determining that an event severity level corresponding to the second event meets crosses the threshold event severity level.

18. A system comprising:
at least one hardware device including a processor; and
the system configured to perform operations comprising:
detecting a first event associated with execution of a first operation;
determining that the first event does not meet a buffer transfer criteria for an event buffer implemented in primary memory;

storing a first log message for the first event in the event buffer by overwriting a prior log message previously stored in the event buffer;

subsequent to storing the first log message in the event buffer, detecting a second event associated with execution of a second operation;

determining that the second event meets the buffer transfer criteria for the event buffer; and responsive to determining that the second event meets the buffer transfer criteria: copying a plurality of log messages stored during an event logging session from the event buffer to secondary storage, the plurality of log messages comprising the first log message, a log message corresponding to the second event, and at least one additional log message that logs an event detected after the second event was logged, the at least one additional log message logged for analysis of the second event.

19. A method comprising:

detecting a first event associated with execution of a first operation;

determining that the first event does not meet a buffer transfer criteria for an event buffer implemented in primary memory;

storing a first log message for the first event in the event buffer by overwriting a first prior log message previously stored in the event buffer;

subsequent to storing the first log message in the event buffer, detecting a second event associated with execution of a second operation;

storing a second log message for the second event in the event buffer by overwriting a second prior log message previously stored in the event buffer;

determining that the second event meets the buffer transfer criteria for the event buffer; and responsive to determining that the second event meets the buffer transfer criteria: copying a plurality of log messages stored during an event logging session from the event buffer to secondary storage, the plurality of log messages comprising the first log message, the second log message, and at least one additional log message that logs an event detected after the second event was logged, the at least one additional log message logged for analysis of the second event.

20. The medium of claim 13, wherein the operations further comprise:

prior to copying the plurality of log messages from the event buffer to the secondary storage, storing the additional log message for the triggering event in the event buffer, wherein the plurality of log messages further comprises the additional log message.

* * * * *

UNITED STATES PATENT AND TRADEMARK OFFICE
CERTIFICATE OF CORRECTION

| | | |
|---|---|---|
| PATENT NO. | : 11,048,429 B2 | Page 1 of 1 |
| APPLICATION NO. | : 15/957736 | |
| DATED | : June 29, 2021 | |
| INVENTOR(S) | : Rodgers | |

It is certified that error appears in the above-identified patent and that said Letters Patent is hereby corrected as shown below:

On the Title Page

Item (57) Column 2, under Abstract, Line 11, delete "what when" and insert -- what went --, therefor.

In the Claims

In Column 15, Line 23, in Claim 9, delete "Read" and insert -- Random --, therefor.

In Column 15, Line 61, in Claim 12, delete "Read" and insert -- Random --, therefor.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*